United States Patent [19]

Arcella et al.

[11] 4,162,291

[45] Jul. 24, 1979

[54] LIQUID SILICON CASTING CONTROL MECHANISM

[75] Inventors: Frank G. Arcella, Bethel Park; Charles B. Wolf, Irwin; Maurice G. Fey, Pittsburgh, all of Pa.

[73] Assignee: Westinghouse Electric Corp., Pittsburgh, Pa.

[21] Appl. No.: 841,409

[22] Filed: Oct. 12, 1977

[51] Int. Cl.² ............... B01D 57/00; B01J 10/00; C25B 1/02; C22B 4/02

[52] U.S. Cl. .................. 422/198; 75/10 R; 250/542; 250/547; 422/129

[58] Field of Search ............ 23/277 R; 75/10 R; 250/531, 542, 547; 266/148, 149, 905; 423/350

[56] References Cited

U.S. PATENT DOCUMENTS

| | | | |
|---|---|---|---|
| 2,825,642 | 3/1958 | Eaton et al. | 266/905 X |
| 2,912,312 | 11/1959 | Mason et al. | 423/350 |
| 3,023,087 | 2/1962 | Enk et al. | 23/277 R X |
| 3,345,134 | 10/1967 | Heymer et al. | 23/277 R |
| 3,445,191 | 5/1969 | Bruning et al. | 23/277 R |
| 3,522,015 | 7/1970 | Maniero et al. | 23/277 R |
| 3,661,764 | 5/1972 | Scammon, Jr. | 250/542 X |
| 3,705,975 | 12/1972 | Wolf et al. | 23/277 R |
| 3,887,359 | 6/1975 | Enger et al. | 423/350 X |
| 4,071,588 | 1/1978 | Fey et al. | 250/542 X |

Primary Examiner—Michael S. Marcus
Attorney, Agent, or Firm—L. P. Johns

[57] ABSTRACT

A liquid silicon casting control mechanism characterized by means for producing liquid elemental silicon and comprising a collecting vessel having a tap hole therein for periodically removing liquid silicon in a controlled manner, and comprising a tubular constricted opening.

6 Claims, 4 Drawing Figures

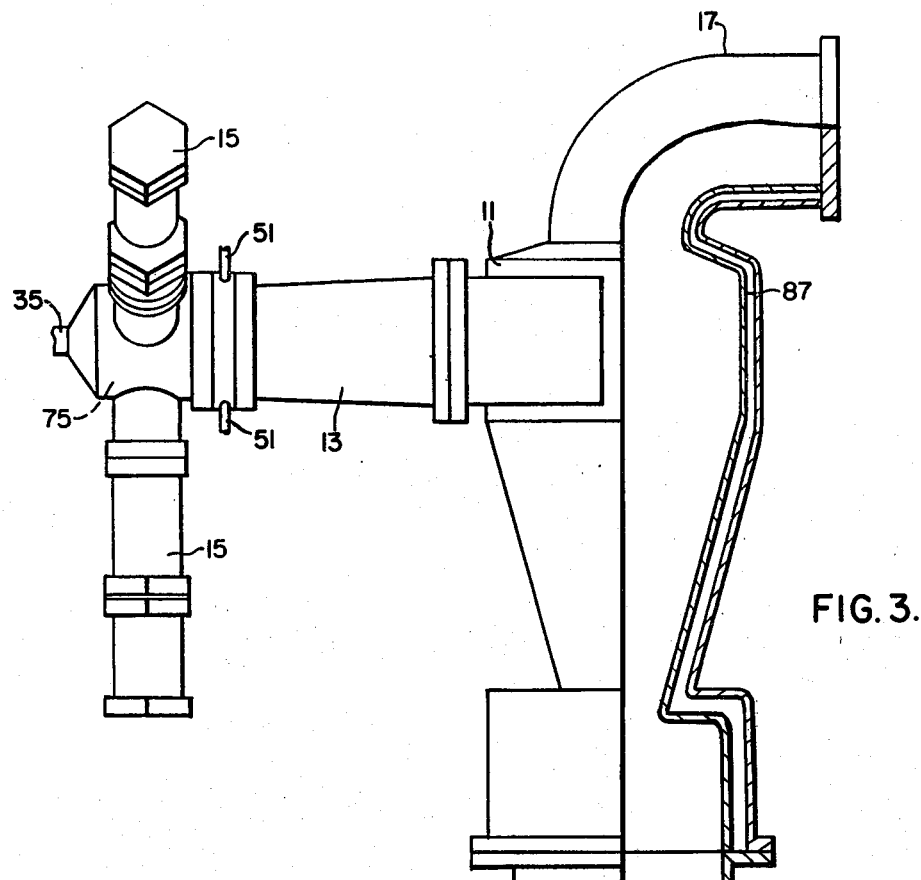
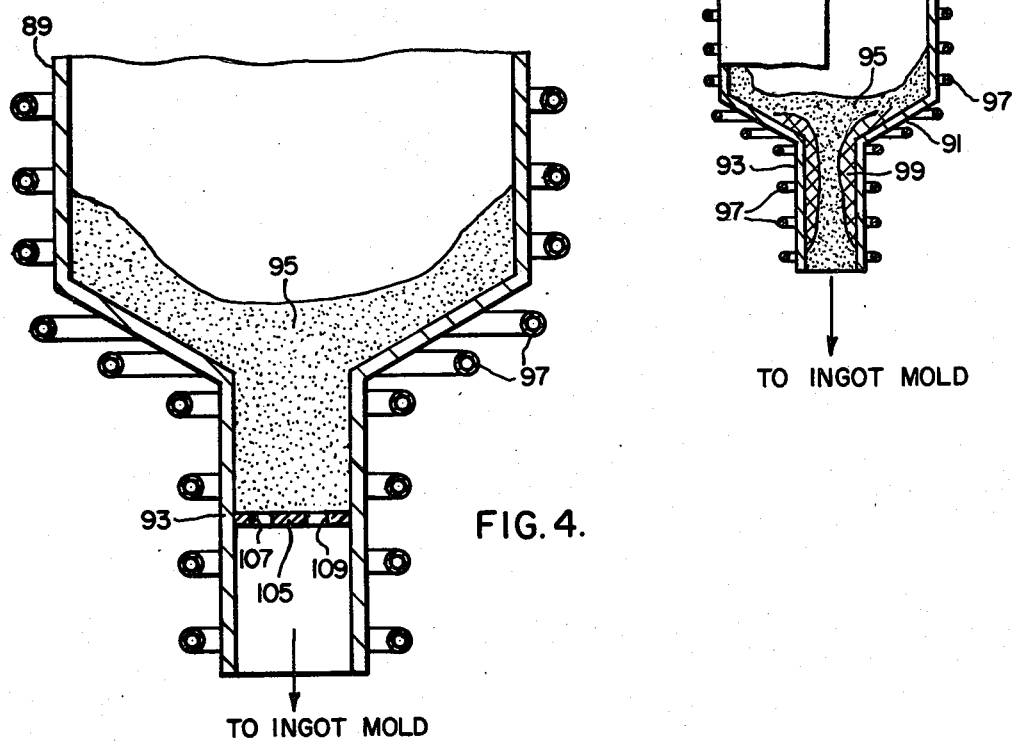
FIG. 3.
TO INGOT MOLD
FIG. 4.
TO INGOT MOLD

LIQUID SILICON CASTING CONTROL MECHANISM

CROSS-REFERENCE TO RELATED APPLICATIONS

This application is related to the application Ser. No. 757,545, filed Jan. 6, 1977 by F. J. Harvey II; Ser. No. 757,546, filed Jan. 6, 1977 by M. G. Fey and F. J. Harvey; Ser. No. 787,635, filed Apr. 14, 1977 by M. G. Fey, F. J. Harvey II, and Robert Mazelsky; Ser. No. 755,383, filed Dec. 29, 1976, by F. J. Harvey II and M. G. Fey; and Ser. No. 787,634, filed Apr. 14, 1977 by M. G. Fey.

BACKGROUND OF THE INVENTION

1. Field of the Invention

This invention relates to means for controlling the casting of liquid silicon.

2. Description of the Prior Art

In the utilization of electric arc heaters for high capacity production of low cost solar grade silicon certain problems are incurred. That is particularly true where production rates of over 200 pounds per hour are anticipated. For example, means must be provided for regulating the flow of molten silicon into an ingot caster as well as for operating the flow without mechanically movable means. In addition, there is a problem of operating in a flow regulating manner at elevated temperatures. Finally, where sodium chloride is a byproduct gas in the production of liquid silicon, there is a problem of preventing this gas from contaminating the cast silicon ingot.

SUMMARY OF THE INVENTION

It has been found in accordance with this invention that the foregoing problems may be overcome by a casting control mechanism for liquid silicon comprising an arc heater having spaced upstream and downstream tubular electrodes forming an arc chamber, means for producing an electric arc in the space between the electrodes, means for injecting a gas into the arc chamber through the space to form an arc stream that extends into and downstream of the arc chamber, means for feeding into the arc stream a quantity of a metal or gas reductant, means for introducing a silicon compound into the arc stream to produce a mixture of liquid elemental silicon and a salt of the metal reductant, means for separating the liquid silicon and the salt, a collecting receptacle for the liquid silicon and having tap hole means for draining liquid silicon therefrom, control means associated with the tap holes means for regulating flow of the silicon through said hole means and comprising a tubular constricted opening. Moreover, in one embodiment of the invention the control means comprises cooling means for freezing liquid silicon in the tap hole means and heating means for melting liquid silicon in the tap hole means. In another embodiment of the invention the control means comprises a liquid silicon passage aperture having a crosssectional area that is a function of the height of the liquid silicon above the aperture, whereby silicon flows when the hydrostatic pressure exceeds the surface tension between the silicon and the aperture.

This invention also comprises a method for controlling casting of liquid silicon comprising the steps of (a) providing an arc heater having spaced electrodes and forming an arc chamber communicating with a reaction chamber, (b) striking an electric arc in an axial gap between the electrodes, (c) introducing an arc gas selected from the group consisting of hydrogen and a mixture of hydrogen and an inert gas through the gap to provide an elongated arc stream, (d) feeding into the arc stream a quantity of a reductant selected from the group consisting of a metal, hydrogen, and a mixture thereof, (e) feeding into the arc stream a quantity of silicon halide to react with the reductant to produce reaction products including liquid silicon and a gaseous salt of the reductant, (f) separating the liquid silicon from the gaseous salt of the reductant, (g) depositing the liquid silicon in a collecting receptacle having a tap hole, and (h) providing the tap hole with stricture means for controlling flow of the liquid silicon from the receptacle.

The advantage of the mechanism and method of this invention is that a valve having no moving parts is provided for tapping liquid silicon with the associated advantage of separating liquid silicon from the byproduct gases resulting from the reduction of a silicon compound source material.

BRIEF DESCRIPTION OF THE DRAWINGS

FIG. 3 is an elevational view partially in section of an assembly of an arc heater system and a cyclone separator; and FIG. 4 is a vertical sectional view of another embodiment of this invention.

DESCRIPTION OF THE PREFERRED EMBODIMENTS

In accordance with this invention the process comprises the following steps:

(a) providing an arc heater having spaced electrodes and forming an arc chamber communicating with a reaction chamber, (b) striking an electric arc in an axial gap between the electrodes, (c) introducing an arc gas selected from the group consisting of hydrogen and a mixture of hydrogen and an inert gas through the gap to provide an elongated arc stream, (d) feeding into the arc stream a quantity of a reductant selected from the group consisting of a metal, hydrogen, and a mixture thereof, (e) feeding into the arc stream a quantity of silicon halide to react with the reductant to produce reaction products including liquid silicon and a gaseous salt of the reductant, (f) separating the liquid silicon from the gaseous salt of the reductant, (g) depositing the liquid silicon in a collecting receptacle having a tap hole, and (h) providing the tap hole with stricture means for controlling flow of the liquid silicon from the receptacle.

Although the foregoing process discloses the introduction of hydrogen with or without an inert gas such as argon at step (c), and the use of a metal reductant such as sodium or mangesium at step (d), it is understood that either step (c) or (d) may be omitted by using a metal reductant or hydrogen as alternatives for reducing the silicon halide to liquid silicon status. However, the preferred method is to use both hydrogen and a metal reductant, because the process is more efficient. For example, where hydrogen alone is used to the exclusion of a metal reductant, inordinate amounts of hydrogen are required.

Figure 1:
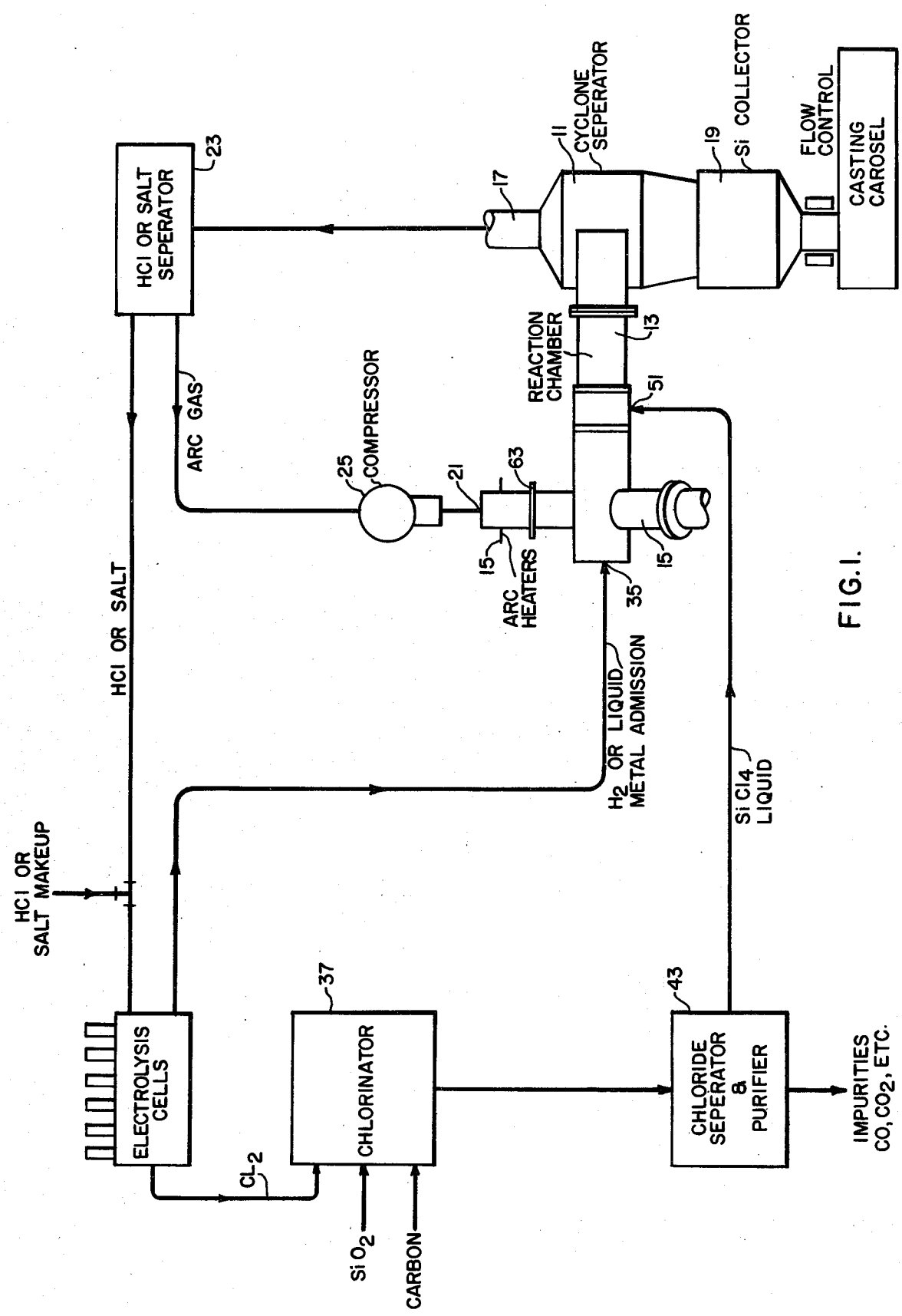
FIG. 1 is a flow diagram for the production of liquid silicon.

The means for performing that process are disclosed diagrammatically in FIG. 1 and comprise a cyclone separator 11 which is supported by associated structures including a reaction chamber or reactor 13, at least one and preferably a plurality of three-phase arc heaters 15, a first vent or outlet means 17 for coproduct gases, and second vent or outlet means 19 for liquid silicon.

Arc gas is introduced into the system at an inlet 21 in the arc heaters 15. The arc gas together with the other coproducts including HCl(g) or metal salt exits from the reactor through the vent 17 and are connected to a cyclone or condenser type separator 23 for separating the arc gas from the HCl or metal salt. The arc gas is redirected through a compressor 25 into the arc heaters at inlet 21. The HCl or metal salt flows from the separator 23 from where it is conducted to an electrolysis cell 31 for disassociation into hydrogen or metal and chlorine. The hydrogen or metal is transmitted to inlet 35 where it is introduced into the reactor 13. The chlorine from cell 31 is conveyed to a chlorinator 37 where, together with a silica bearing material, such as SiO2, and carbonaceous material, such as coke, react to produce silicon tetrachloride, impurity chlorides, and oxides of carbon. The mixture of gases that are produced in the chlorinator proceed to a separator 43 to purify the silicon tetrachloride which is transferred to the reactor 11 at an inlet 51.

Figure 2:
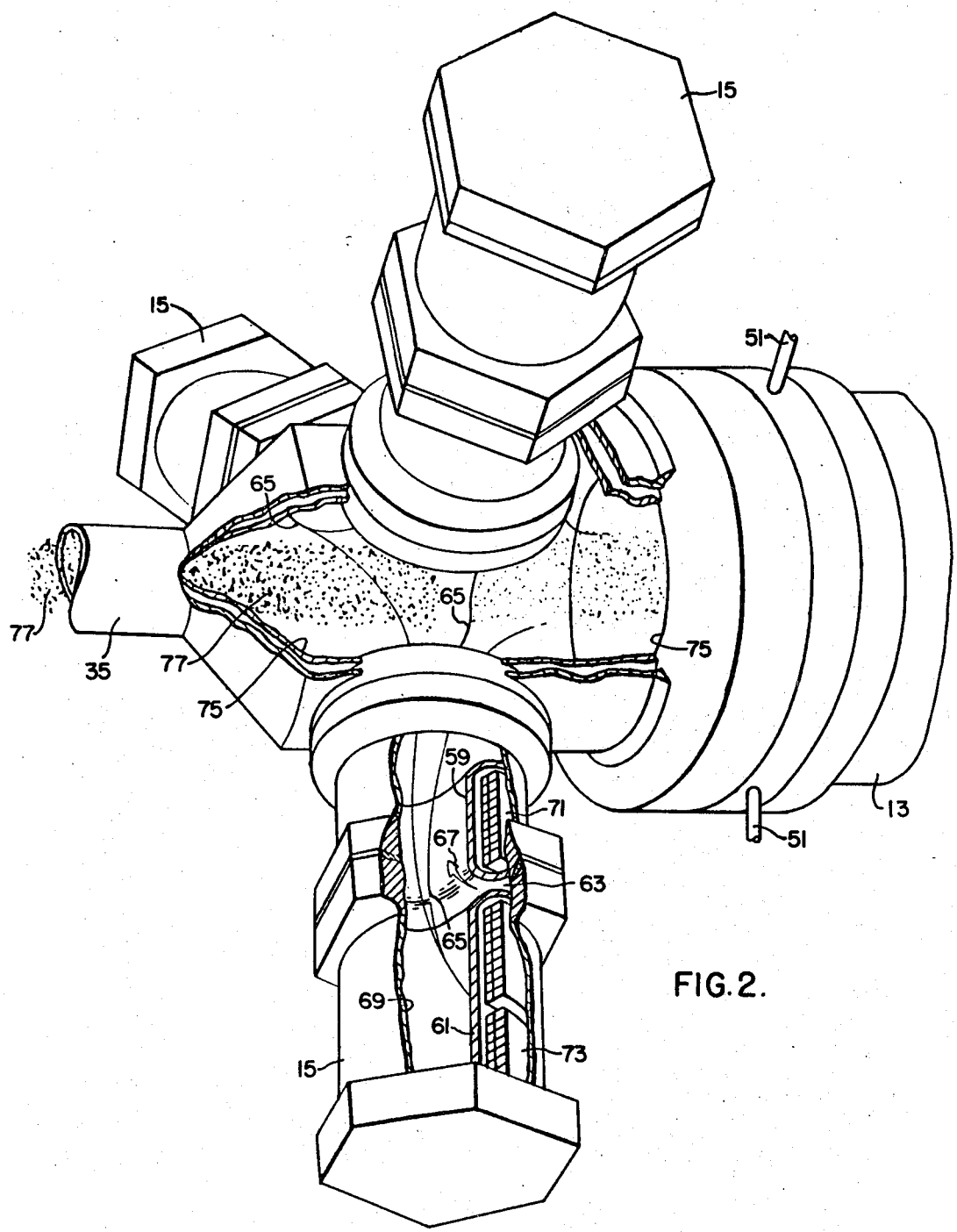
FIG. 2 is a perspective view with broken away portions showing a three phase arc heater system.

As shown in FIG. 2, one or more and preferably three arc heaters 15 are similar in construction and operation to that disclosed in U.S. Pat. No. 3,765,870, entitled "Method Of Direct Ore Reduction Using A Short Gap Arc Heater" of which the inventors are M. G. Fey and George A. Kemeny. Because of the full disclosure in that patent, the description of the arc heaters 15 is limited herein to the basic structure and operation. The arc heaters 15 (FIG. 2) are each a single phase, self-stabilizing AC device capable of power levels up to about 3500 kilowatts, or up to about 10,000 kilowatts for a three phase plant insulation. In the practice of this invention, it is preferred that three arc heaters be provided, one for each of the three phases of the AC power supply.

The arc heater 15 has two annular copper electrodes 59, 61 which are separated at a space or gap 63 about one millimeter apart to accommodate a line frequency power source of about 4 kV. An arc 65 occurs in the space 63 and incoming feed stock gas 67 immediately blows the arc from the space into the interior of an arc chamber 69. The feed stock gas 67 must be compatible with the silicon and may be one of the gases selected from the group consisting of inert gases, hydrogen, silicon halides, and mixtures thereof. The arc 65 rotates at a speed of about 1000 revolutions per second by interaction of the arc current with a DC magnetic field set up by externally mounted field coils 71, 73. The velocities yield a very high operating efficiency for equipment of this type and the elongated arc 65 is ultimately projected by the gas downstream toward and possibly into the reaction chamber 13. Feed stock material is introduced through inlet ports 35, 51, which are preferably down stream of the electrode 61 so that the materials enter into the elongated arc 65 as shown in FIG. 2.

The reacting materials are halides of silicon, a reductant metal of the alkali or alkaline-earth metals, such as sodium and magnesium, and/or hydrogen. Although the preferred silicon halide is silicon tetrachloride, any other halide such as silicon tetrabromide, may be used.

The molten silicon product created by the arc heater in an exothermic reaction is in accordance with the following general formulas:

$$SiCl_4 + 4Na\ (v) \rightarrow 4NaCl\ (v) + Si\ (l) \qquad (1)$$

$$SiCl_4 + 2H_2 \rightarrow Si + 4HCl \qquad (2)$$

The reactor system, comprising the three arc heaters 15 (FIG. 2), directs the arc 65 into a plenum chamber 75 into which the reductant metal or gas 77, such as sodium or H2, is injected, preferably as a liquid spray through an inlet 35. Within the chamber 75 the metal 77 enters into the arc 65 where it combines with the arc stream gas 67 which is preferably a mixture of hydrogen and argon, from where it is propelled downstream (to the right as viewed in FIG. 2).

As shown in FIG. 3 the plenum chamber 75 is connected by the reaction chamber or reactor 13 to a cyclone separator 11. Inlet ports 51 are located downstream of the chamber 75 for injection of the silicon halide. The silicon halide combines with the sodium or hydrogen in accordance with the formulas (1) and (2).

The resulting products of the above reactions are projected tangentially into the cyclone separator 11 from where the gaseous products including sodium chloride or hydrogen chloride are exhausted through the outlet means 17. The liquid silicon collects on a liner 87 within the separator and flows downwardly to the lower end where it collects in receptacle 89.

In accordance with this invention the receptacle 89 includes a bottom wall having an inclined surface 91 and a tubular constricted opening 93 which serves as tap hole means for the receptacle 89. Means for melting silicon within the opening 93 comprising an R.F. coil 97 is provided to raise the temperature of the silicon to a temperature above the melting point to drain silicon from the receptacle 89. In addition the R.F. coil 97, being water-cooled is also available for cooling the silicon within the opening 93 to a temperature below the melting point. As shown in FIG. 3, a solidified layer 95 of silicon may extend from the inner wall of the receptacle downwardly over the inclined surface 91 and through the opening 93. Control of the casting of silicon is maintained by freezing or melting a central portion 101 of silicon within the opening 93 by operation of the water cooled coil 97 and the RF coil 97, whereby liquid silicon 95 may be poured or tapped from the receptacle 89 to an ingot mold (not shown). As the solid silicon axis dimension increases, the resistance to the RF coil increases as coupling improves. The RF coil heats the center of the frozen silicon where the field lines converge and permit the silicon flow orifice to vary in diameter, thus regulating flow. The opening is always solid or liquid, but never opened to movement of NaCl vapor to the silicon ingot formed below, and thus the deleterious effects of contaminants of solar cell silicon are prevented.

Another embodiment of the invention is shown in FIG. 4 in which similar numerals refer to similar parts. A plate 105 having circular holes 107 is disposed across the cross section of the tubular opening 93. Surface tension of the molten silicon 95 as indicated by a projecting portion 109 of liquid silicon prevents its passage through the holes 107 until a sufficient hydrostatic head of liquid silicon above the plate 105 is accumulated. The governing expression is the formula:

$$(2\gamma/r_c)\cos\theta = \rho g h, \qquad (3)$$

where
- $\gamma$ = surface tension of silicon
- $r_c$ = radius of hole
- $\theta$ = wetting angle
- $\rho$ = density of silicon
- g = gravity constant
- h = height of silicon where hydrostatic pressure exceeds surface tension pressures, and silicon flow begins In operation, the plate 105 prevents the liquid silicon 95 from flowing through the opening to the ingot mold below. Once the critical height h is exceeded, liquid silicon will flow until the height drops below the critical height h. Thus, there is always a molten pool of silicon in the teeming throat or opening as maintained by the RF coil 97. In this manner, the bypass of NaCl vapors and contaminants is prevented.

Accordingly this silicon casting flow control mechanism avoids problems which would be encountered if more conventional flow control means were utilized, such as a sliding gate valve. The avoidance of mechanical parts in contact with the liquid silicon enables the avoidance of contamination of the final product by sodium chloride and other contaminants.

What is claimed is:

1. A liquid silicon casting mechanism comprising an arc heater having spaced cylindrical electrodes forming an arc chamber, means connected to and external of the chamber for forming an electric arc in the space between the electrodes, means connected to and external of the electrodes for injecting gas into the arc chamber through the space to form an arc stream that extends into and downstream of the chamber, means associated with the arc heater for feeding into the arc stream a quantity of a reductant, a plenum chamber connected to and communicating with the arc chamber to combine the reductant and the arc stream, means downstream of the arc chamber for introducing a silicon compound into the arc stream in said plenum chamber, a reaction chamber downstream of the plenum chamber for producing a mixture of liquid elemental silicon and a salt of the reductant, means downstream of the reaction chamber for separating the liquid silicon and the salt, a collecting receptable for the liquid silicon having tap hole means for draining liquid silicon therefrom, and control means associated with the tap hole means for regulating flow of the silicon through said hole means comprising a tubular constricted opening, cooling means for freezing liquid silicon in the tap hole means, and heating means for melting liquid silicon in the tap hole means.

2. The mechanism of claim 1 in which said tap hole means comprises a liquid silicon passage aperture having a cross-sectional area that is a function of the height of liquid silicon above the aperture whereby silicon flows when the hydrostatic pressure exceeds the surface tension forces of the silicon protruding through the aperture.

3. The mechanism of claim 2 in which the silicon compound is silicon tetrachloride.

4. The mechanism of claim 3 in which the reductant is selected from a group consisting of an alkali metal, an alkaline-earth metal, hydrogen, and mixtures thereof.

5. The mechanism of claim 4 in which the cooling means comprises liquid cooled walls.

6. The mechanism of claim 4 in which the heating means comprises an induction heating means.

* * * * *